United States Patent [19]
Griffen

[11] Patent Number: 5,308,931
[45] Date of Patent: May 3, 1994

[54] HYSTERESIS-COMPENSATED WEIGHING APPARATUS AND METHOD

[75] Inventor: Neil C. Griffen, Westerville, Ohio

[73] Assignee: Mettler-Toledo, Inc., Worthington, Ohio

[21] Appl. No.: 988,350

[22] Filed: Dec. 9, 1992

Related U.S. Application Data

[63] Continuation of Ser. No. 523,908, May 16, 1990, abandoned.

[51] Int. Cl.⁵ .................... G01G 19/40; G01G 19/52
[52] U.S. Cl. .................................. 177/25.14; 177/50; 364/567
[58] Field of Search ................ 177/25.14, 50; 364/567

[56] References Cited

U.S. PATENT DOCUMENTS

| | | | |
|---|---|---|---|
| 3,709,310 | 1/1973 | Cooke et al | 177/168 |
| 4,281,731 | 8/1981 | Södler et al. | 177/212 |
| 4,535,854 | 8/1985 | Gard et al. | 177/25.15 |
| 4,691,290 | 9/1987 | Griffen | 364/567 |
| 4,849,918 | 7/1989 | Feinland | 177/25.15 |

FOREIGN PATENT DOCUMENTS

| | | |
|---|---|---|
| 85108471A | 5/1987 | China . |
| 0137324 | 4/1985 | European Pat. Off. . |
| 0171237 | 2/1986 | European Pat. Off. . |
| 0217434 | 4/1987 | European Pat. Off. . |
| 2919227 | 11/1980 | Fed. Rep. of Germany . |
| 3303469 | 10/1983 | Fed. Rep. of Germany . |
| 2193476 | 2/1974 | France . |
| 2554585 | 5/1985 | France . |
| 2600159 | 12/1987 | France . |
| 1479192 | 7/1977 | United Kingdom . |
| 2008773 | 6/1979 | United Kingdom . |
| 2221039 | 1/1990 | United Kingdom . |

*Primary Examiner*—George H. Miller, Jr.

[57] ABSTRACT

A digital scale is compensated for hysteresis by characterizing an envelope pattern of increasing and decreasing linearity attributes thereof defining the limits of hysteresis error. Polynomial expressions define this envelope pattern and a correction procedure is developed which is based upon offsets from the envelope pattern as well as the merging characteristics of deviations evidenced from complex loading histories. The latter historical data are used to identify loading progression transitions necessary for the generation of correction values.

19 Claims, 7 Drawing Sheets

HYSTERESIS-COMPENSATED WEIGHING APPARATUS AND METHOD

This is a continuation of copending application Ser. No. 07/523,908 filed on May 16, 1990 now abandoned.

BACKGROUND OF THE INVENTION

Investigators seeking to improve the accuracy of force-measuring devices such as weighing scales are called upon to consider and attempt compensation for a variety of phenomena such as drift, anelastic creep, temperature induced effects, and hysteresis. The latter, hysteresis phenomenon, has posed significant problems for many years and finds its origin in the load cells or transducers of force measuring devices. Typically, a force measuring device will be configured having a weight receiving platform supported, in turn, by a load cell incorporating a counterforce or structure stressed by and responding in strain between loads applied to the platform and the device or scale ground. Force measuring instrumentation of the load cell, such as strain gauges and the like, react to such strain to provide an output, typically requiring correction for the above phenomena. Hysteresis, or as it is sometimes called, "Internal Friction" appears in the output of the transducer when a series of loads are applied and then removed in any of a myriad of sequences. In a typical course of scale usage these sequences of loading, for the most part, are of a random nature, for example, loads extending in value from partial to full being added and either fully or only partially removed from the scales. Comparing the outputs or readings of the devices as such loads are removed with the readings, at the same load, as the loads are being applied, results in a difference. This difference is considered to be hysteresis. The hysteresis effect arises primarily from the material properties and geometry of the weighing apparatus transducer. For example, all counterforce materials, whether metal or glass/ceramic exhibit hysteresis to varying degrees. Conventional, epoxy based strain gauges, as are used extensively in weighing devices, also exhibit hysteresis and contribute significantly to the overall hysteresis seen in scale outputs. Apart from strain gauge generation of the effect, the hysteresis phenomenon may also arise from the method of mounting or applying a load to the scale transducer. In this regard, there often is a slippage or movement between the load cell and the scale structure which is manifested as hysteresis.

A conventional approach to improving the hysteresis effect has been to improve the quality of the counterforce or transducer material. For example, lower levels of hysteresis are exhibited by forming the load cells of such materials as beryllium-copper or glass/ceramic materials. However, these approaches are considered overly-expensive for employment with scale structures intended for conventional utilization. The latter materials also are subject to certain manufacturing difficulties. Improvement in hysteresis has been achieved for certain applications by varying production parameters and heat treating procedures. However, these techniques are heuristic in nature and essentially non-repeatable from component to component. While a hysteresis effect will appear in the strain gauges of load cell instrumentation, other sensors such as those representing the vibrating wire or capacitor technique do not exhibit hysteresis in and of themselves but the phenomenon will appear in the output of cells having such instrumentation, inasmuch as it remains within the overall counterforce structure.

With the advent of microprocessor driven instrumentation, a practical approach to this phenomenon will be to achieve a predictive method for digital correction of hysteresis at the load cell output. However, this approach requires an accurate quantification of the hysteresis based behavior of load cells. Such a predictive digital correction approach has been successfully introduced with respect to creep pheomenon. See in this regard U.S. Pat. No. 4,691,290 entitled "Creep-Compensated Weighting Apparatus" by Griffen, issued Sep. 1, 1987, and assigned in common herewith.

SUMMARY

The present invention is addressed to a method and apparatus for carrying out the correction of a hysteresis phenomenon exhibited by measuring devices, for example, those measuring force or weight, displacement, material analysis and related devient systems. The inventive approach to correction follows from laboratory based discoveries and observations of certain characteristics of the phenomenon. In this regard, it has been observed that the hysteresis effect is repeatable and is not time dependent. Such characteristic of repeatability is associated with the immediate history of loading progression of the weighing device. Further, a progression or sequence of loads or weights applied to a weighing device from zero or minimum loads to a maximum load value will result in a sequence of deviations of outputs or readings from straight line performance which are repeatable. Straight line performance is considered one in which the indicated output of the device is proportional to the weight applied. The output of the noted adding sequence, when plotted in graphic form is characterizable and referred to as an increasing linearity. Similarly, a progression or sequence of loads applied to a scale from a maximum load to a minimum or zero load will result in a sequence of deviations from straight line performance which also are repeatable. This output in decreasing loadings may be plotted and characterized as a decreasing linearity. By combining the increasing linearity and decreasing linearity curves an envelope pattern is generated converging at the maximum and minimum load positions. All weighing deviations attributable to hysteresis are found to occur within this envelope pattern. Additional analysis revealed that the output readings of device for any series of loading progressions will tend to evoke deviations returning to the limits of the envelope pattern as weight continues to change in the same direction in the sense of increasing weight progressions or decreasing weight progressions.

Based upon the above observations and discoveries, the hysteresis characteristic of a force measuring device can be quantified and thus a corrective procedure of requisite accuracy can be devised which may be implemented through the computational capabilities of a conventional microprocessor function.

A method according to the present invention for correcting the output of a weighing scale for hysteresis effects occurring between minimum and maximum loads applied thereto with a given load progression history comprises the steps of:

deriving a polynomial expression representing the increasing linearity characteristic values of the scale extending from the minimum to maximum loads;

deriving a polynomial expression representing the decreasing linearity characteristic values of the scale extending from the maximum to minimum load;

providing a correction expression representing an offset from one of the polynomial expressions;

obtaining a representation of the value, R, of a load applied to the scale;

deriving a correction value as an application of the value, R, to the correction expression;

adjusting the value, R, by the amount of the correction value; and outputting the adjusted value.

Another feature of the invention provides measuring apparatus compensated for hysteresis which includes a measuring mechanism as well as a memory feature for retaining the load progression history of the measuring mechanism and the increasing and decreasing deviation linearity characteristics thereof between maximum and minimum loads. An arrangement for obtaining a representation, R, of a load on the measuring mechanism is provided. A control of the apparatus is responsive to the load representation, R, to memory stored load progression history, and a select deviation linearity characteristic for deriving a correction value and combining that correction value with the load representation, R, to provide a corrected weight representation, and for storing change in the load progression history represented by the load representation, R, in the memory.

The invention further provides a method for correcting the output of a force measuring apparatus for hysteresis which comprises the steps of:

obtaining a representation of the force applied to the force measuring apparatus;

deriving the hysteresis state of the force measuring apparatus using the force representation and the immediate past force application sequence history of the apparatus; and combining the derived hysteresis state of the force measuring apparatus with the force representation to provide an indication of the force applied to the force measuring apparatus compensated for the effects of hysteresis.

As another feature, the invention provides a method for reducing ambiguity in the measured outputs of a measuring apparatus responsive to loads, occurring within increasing and decreasing type loading sequences, comprising the steps of:

retaining the load progression history of loads placed upon the measuring apparatus as such measured outputs, such type of loading sequence, and transitions thereof, and the increasing and decreasing deviation linearity characteristics of the apparatus between maximum and minimum loads;

obtaining a current measured output as a value R;

deriving a correction value based upon the value, R, the load progression history, and a select linearity characteristic;

adjusting the value, R, by the amount of the correction value; and outputting the adjusted value.

As another feature, the invention provides weighing apparatus compensated for hysteresis effects occurring between minimum and maximum loads applied thereto with a given load progression history. The apparatus includes a weighing mechanism as well as means for storing expressions representing the increasing and decreasing deviation linearity characteristics of the weighing mechanism extending between the minimum and maximum loads. An arrangement for obtaining a representation of value, R, of a load applied to the weighing mechanism is provided as well as means for deriving a correction value as an application of the value, R, to a correction expression representing an offset from one of the deviation linearity characteristic expressions. Additionally, means are provided for adjusting the value, R, by the amount of the correction value and an arrangement for outputting the adjusted value is provided.

Other objects of the invention will, in part, be obvious and will, in part, appear hereinafter.

The invention, accordingly, comprises the apparatus and method possessing the construction, combination of elements, steps and arrangement of parts which are exemplified in the following detailed disclosure. For a fuller understanding of the nature and objects of the invention, reference should be had to the following detailed description taken in conjunction with the accompanying drawings.

DETAILED DESCRIPTION OF THE INVENTION

The correction procedure to hysteresis set forth herein is derived from laboratory based investigation and observation upon which a quantified approach to correction has been achieved. Thus, in the discourse to follow, these observations are described both in conjunction with experiment-based information and, in the interest of clarity, in conjunction with simplified or representative figures.

Figure 1:
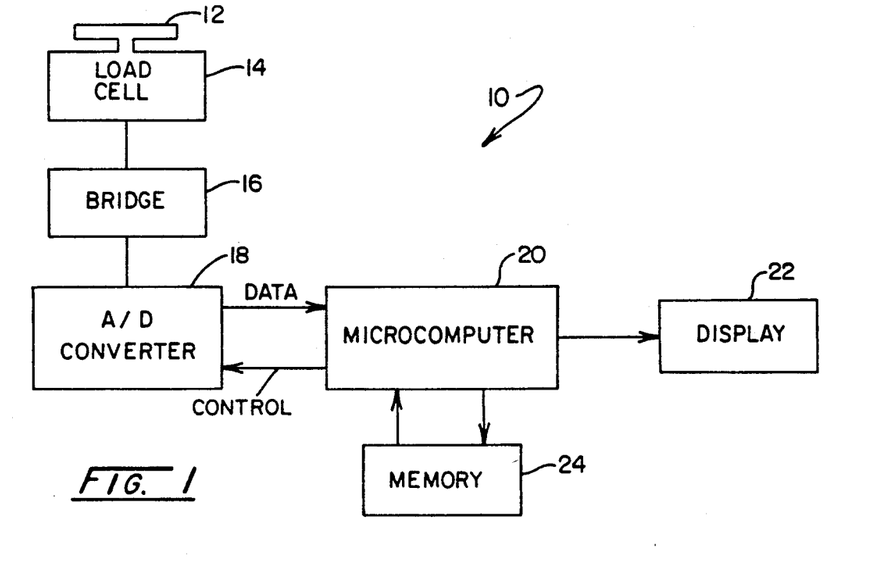
FIG. 1 is a block diagram of a microcomputer controlled weighing apparatus subject to the effects of hysteresis and incorporating the present invention.

Looking initially to FIG. 1, a typical force measuring apparatus or scale which may incorporate the hysteresis correction features of the invention is revealed generally at 10. Scale 10 includes a weighing mechanism including a weight receiving pan 12, sometimes referred to as a platter or platform which is situate upon a load cell 14. Load cell 14 performs in conjunction with a strain gauge bridge represented at block 16. A load placed upon pan 12 produces strain within load cell 14 which is detected by the strain gauges of the load cell to, in turn, unbalance the bridge component 16 of the instrumentation. The unbalance responsive output of bridge 16 provides an analog weight signal to an analog-to-digital (A/D) converter 18 which functions to convert the analog values to digital form signals. Converter 18 is under the control of a microprocessor driven control or microcomputer represented at block 20. Data submitted to the control function 20 from converter 18 is processed for appropriate calibration based and predictive correction and submitted to an appropriate output represented in the figure as a display 22. Pertinent control and historic data are retained in a memory function represented at block 24 for utilization by the microcomputer 20. In this regard, this memory function will include conventional read only memory (ROM) as well as random access memory (RAM) which retains the historic data required of the instant correction procedure and thus will include a non-volatile data retention capability.

Figure 2:
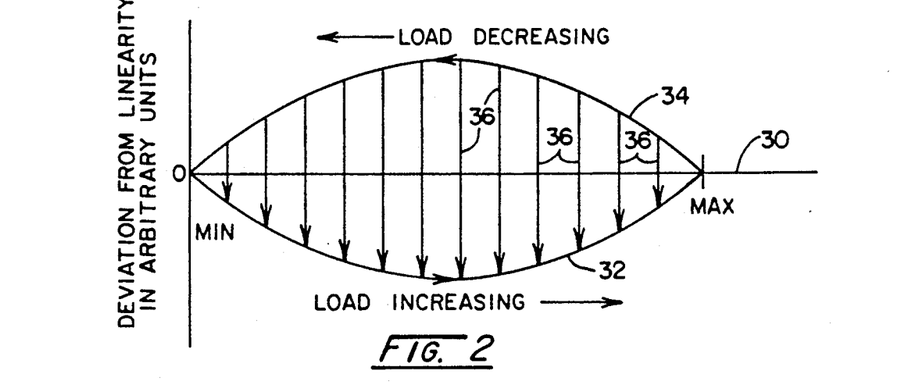
FIG. 2 is a graph showing deviation from linearity for a weighing device illustrating the envelope pattern formed by increasing and decreasing linearity characteristics.

FIG. 2 is a representative graph depicting the variation from straight line linear output of a strain gauge based transducer considering only the effect of hysteresis. The graph represents a plot of deviation from linearity in arbitrary units versus load applied where the load is applied from a minimum value, for example 0 load, to a maximum load value. If weights were applied to a scale in a progressive fashion from noted minimum to maximum values and the scale exhibited no hysteresis or ideal linearity, then, the output of the scale may be represented during the progressive application of loads by the straight line performance line 30 extending between the minimum load value and the maximum load value and showing a zero deviation from linearity. Continuing to assume this perfect model, as the loads or weights are progressively removed, then the output of the scale will again retrace along line 30 showing no deviation from straight line linearity. However, accounting now for hysteresis phenomenon, as progressive weights are applied to the scale, there exists a deviation from the idealized straight line linearity 30 behavior which is referred to herein as "increasing linearity" and is represented by the lower curve 32. During this progression of weights from minimum to maximum loading, the scale output will tend to be low and is thus shown, for the instant purpose, as a negative bow form of curve 32. In accordance with the instant observation, should the weights now be progressively removed from the scale commencing with maximum load, the readouts of the scale will deviate from the straight line linearity represented by line 30 in a manner now represented by the bow shaped curve 34. Note that the curve 34 is of opposite sign from curve 32 and is represented as being equal in magnitude of deviation. This symmetry of the envelope defined by curves 32 and 34 is not inherent in a given measuring device. However, by mathematical adjustment, may be developed for such device, a preliminary procedure sometimes found helpful to the practitioner. Curve 34 is termed a "decreasing linearity". Hysteresis is the difference between the increasing linearity 32 and the decreasing linearity 34 and may be graphically represented, for example, by the vertical arrows, certain of which are shown at 35 and which are seen to be contained within a closed envelope encompassed by curves 32 and 34.

Assuming that a scale is operated under the restrictive parameters of progressing from minimum or zero load to maximum load and then removing the load until a zero loading again is reached, then a correction for the resultant hysteresis is readily accomplished. For example, a mathematical expression can be developed to describe the parabolic nature of curves 32 and 34. Knowing whether the condition of weighment is one where the load is increasing or whether the load is decreasing, then a polynomial expression, for example a quadratic expression, may be readily developed to correct the scale output for an increasing condition or a decreasing condition. Of course, the reading or output representation of the scale under these conditions is one which, in and of itself, represents a hysteresis error. Laboratory observation has shown that the hysteresis condition is repeatable for the above-discussed performance parameters requiring excursions between minimum and maximum load values. While the above represents a facile remedy for correction, the underlying operational parameters as noted are quite limited.

Figure 3:
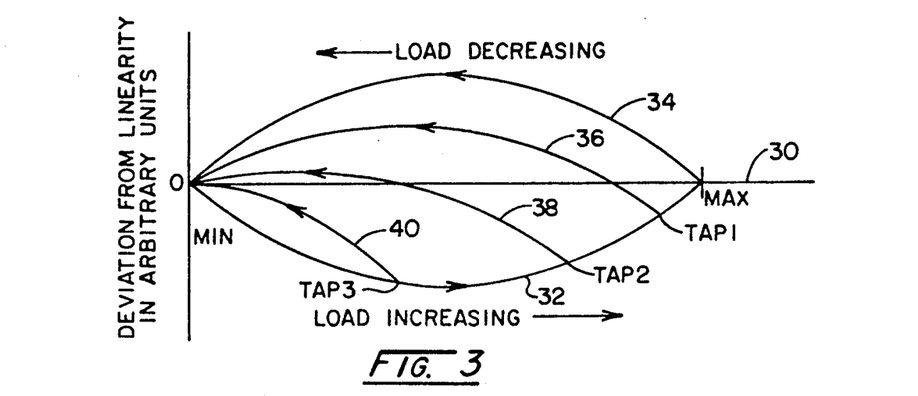
FIG. 3 is a graphical representation as in FIG. 2 but illustrating the termination of an increasing load condition from turn-around points to minimum loading.

Now, looking to FIG. 3, a next operational parameter or condition of use of a scale or force measuring apparatus, considers a condition retaining the same first parameters as represented by curves 32 and 34 in FIG. 2 but under an additional condition where the applied load always commences at minimum value or zero and progressive weights are applied to define earlier-described curve 32. However, under the revised conditions at hand, loads are removed after having been applied from a zero or minimum load before reaching the maximum load value. For example, where loads are removed from a position near the maximum loading condition as represented by a turn-around point TAP 1, then the decreasing linearity or load decreasing locus of points will define a curve 36 tracing to the zero or minimum position from TAP1. Similarly, a removal of loads at an earlier location as identified at turn-around point TAP 2 will evoke a load decreasing locus of output points defining curve 38 which extends from TAP 2 to zero or minimum position. Finally, an earlier removal of load, for example at turn-around point TAP 3, will result in a decreasing load locus of points defining a curve 40.

From the foregoing it may be observed that the envelope curves 32 and 34 remain for this demonstration and that the increasing linearity curve 32 remains the same for this condition, however, the decreasing load curves 36-40 would require a different mathematical definition for the instant conditions. To generate a requisite algorithm or expression determining readout correction, it will be found that the appropriate turn-around point (TAP) must be known. Note, additionally, that curves 36, 38, and 40 remain within the envelope pattern defined by increasing linearity curve 32 and decreasing linearity curve 34.

Figure 4:
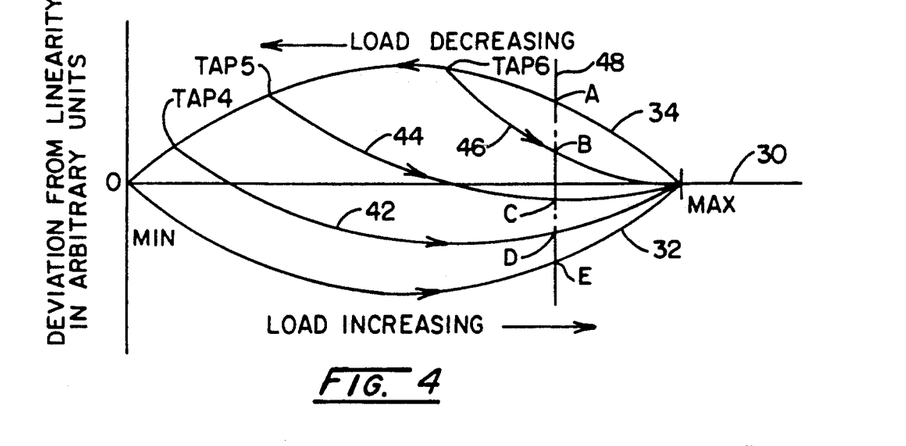
FIG. 4 is a graphical representation similar to FIG. 2 but showing a load progression alteration wherein loading is reversed from a load decreasing condition at turn-around points and increased to maximum loading value.

Referring to FIG. 4, another hysteresis condition is depicted stemming from a loading model wherein loading commences at minimum or zero load and progresses to maximum load. From that maximum load then weights are removed, whereupon weights are again added up to the maximum loading position. The resultant hysteresis pattern is one representing, in effect, a rotated image of that represented in FIG. 3. Note in this regard, that the increasing linearity curve 32 remains as before as well as the decreasing linear curve 34. However, as loads are removed from the maximum position and the hysteresis condition is tracked along decreasing linearity curve 34, a sequence of turn-around points may be considered wherein load removal is halted and the weights again are applied to maximum value. Note that such a condition is represented by curve 42 extending from turn-around point TAP 4 on decreasing linearity curve 34. Similarly, as loads are removed to cause the system to track decreasing linearity curve 34 to turn-around point TAP 5, and then the loads are reasserted, the increasing linearity curve 44 is developed to the maximum load point and, in like manner, as loads or weights are removed to the turn-around point represented at TAP 6 and then reasserted to maximum value, an increasing linearity curve of shorter stature as represented at 46 is developed. With this arrangement, while a mathematical algorithm for decreasing linearity curve 34 remains as before, the increasing linearity curves 42, 44, and 46 are foreshortened and require an adjusted mathematical definition. The patterns represented in FIG. 4 represent a condition encountered in scale usage where the scale is never unloaded and weights are added and removed.

Considering a compensation approach for the loading parameters or conditions of FIG. 3 and FIG. 4, it may be contemplated that, for a given weight placed on a scale under the conditions of a variety of given load histories, numerous scale outputs will be developed for that singular weight, each requiring a unique compensation. For example, in FIG. 4, if a load having a true weight value represented by the intersection of dashed line 48 with line 30 is weighed under conditions represented by curves 32, 34, and 42–46, then the five different uncorrected outputs represented at A–E become possible. To achieve a correction for the conditions of FIGS. 3 and 4, it is necessary to know the history of loading. In this regard, the appropriate transition position or turn-around point (TAP) is required to be known as well as load progression, i.e. a condition of load increase from minimum or zero load or load decrease from maximum load. For the loading conditions or parameters thus far described, a variety of algorithms can be derived to achieve correction for hysteresis. Mathematical expressions representing increasing linearity curve 32 and decreasing linearity curve 34 will be known and preferably will represent an adjustment such that these curves are symmetrical, for example, about line 30. An elaborate approach to such corrections involves the determining of mathematical expressions for curves for each of the conditions shown as developed, for example, at one percent increments along the curves 32 and 34. A simpler approach stems from the proportionality of the foreshortened curves with respect to the appropriate and corresponding increasing linearity curve 32 or decreasing linearity curve 34. By monitoring the turn-around points (TAP) a correction may be derived by a multiplication representing the ratio of the turn-around point to an appropriate minimum or zero and maximum loading value. In effect, with the instant, less elaborate model and more complex conditions to follow, the turn-around points (TAP) become load history points. For the above-described procedures and those to follow, the state of hysteresis of the weighing apparatus is required to achieve predictive correction.

Figure 5:
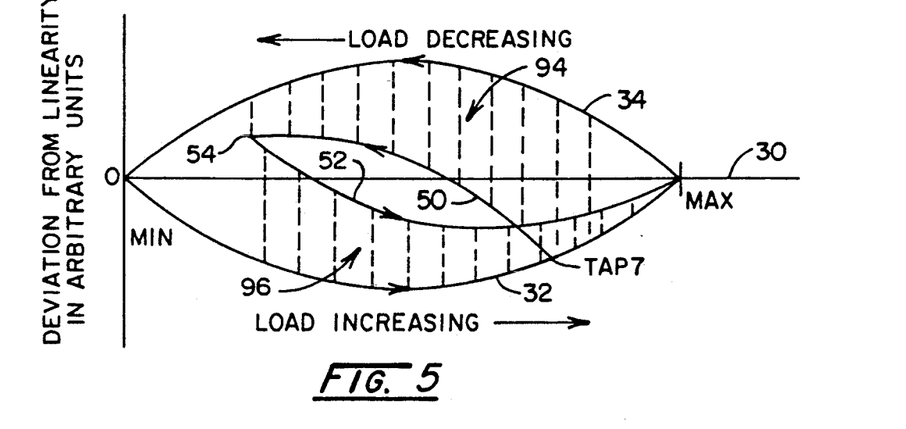
FIG. 5 is a graphical representation similar to FIG. 2 but showing deviation characteristics for a complex progression of loadings.

Referring to FIG. 5, hysteresis characteristics corresponding with a more commonly encountered and more complex loading history are revealed in graphical form in similar fashion as shown in FIGS. 2–4. In FIG. 5, the ideal output line 30 again is reproduced along with increasing linearity curve 32 and decreasing linearity curve 34 providing the envelope pattern as before. For the loading conditions depicted, loads commence at zero load or minimum load and are brought to full load. Weights are then removed as represented at curve 34 to zero or minimum load and loading then increases as again represented curve 32 to turn-around point TAP 7. Load then is removed but not to the full extent, i.e. to zero loading. This condition evolves load decreasing curve 50 which emulates the curves described at 36, 38, and 40, in conjunction with FIG. 3. However, curve 50 terminates at intra-envelope turn or transition position, i.e. turn-around point TAP8, whereupon weights again are applied to the apparatus to generate a load increasing curve 52 extending from TAP8 to the maximum load position. Curve 52 is seen to resemble curves such as represented at 42, 44, and 46 described in conjunction with FIG. 4. It may be observed that the excursions represented by curves 50 and 52 as well as those described in conjunction with FIGS. 3 and 4 all remain within the envelope pattern defined by increasing linearity curve 32 and decreasing linearity curve 34.

Observation of the above-discussed hysteresis phenomenon under laboratory conditions has resulted in the following observations:

(1) the hysteresis phenomenon is repeatable. If exactly the same weights are applied to a scale in the same order, the outputs of the scale will repeat;

(2) if maximum and minimum loads or weights are established, the deviation envelope pattern represented by linearity curves 32 and 34 generated by increasing the applied loads from the minimum to the maximum and returning to the minimum becomes a limiting envelope. Any variation of weights between these limits will not generate an output outside of this envelope pattern;

(3) the scale outputs tend to return to the envelope pattern limits as the load applied or weight continues to change in a singular direction, i.e. towards the maximum load convergence of the envelope pattern or the zero or minimum convergence.

Now considering a program for employment by a microcomputer to carry out a compensation for hysteresis in accordance with the invention, initially considered is the simplest weighing procedure cases as represented and described in connection with FIGS. 2 and 3 above. To generate a program of predictive correction for these cases, initially the noted envelope pattern extant between curves 32 and 34 is characterized. A technique for carrying this out is to apply weights to the transducer in question in a simple cycle, from a minimum load to a maximum load and then back to a minimum load. Two curve fitting algorithms then may be developed, the first to fit or match the increasing linearity curve 32 and the second to match the decreasing linearity curve 34. Thus, these two curves, as they converge, will define the noted envelope pattern. As noted earlier herein, it is desirable that the pattern be mathematically adjusted such that curves 32 and 34 are symmetrical about line 30. A polynomial which may be employed to carry out the above matching may be as follows:

$$A*R + B*R^2 + C*R^3 \qquad (1)$$

In the above expression, R is the basic reading which, preferably, will represent the count output of the weighing apparatus corrected for creep and having been digitally filtered. The selection of the form of data whether corrected or uncorrected for phenomena other than hysteresis is a matter of design choice. In the expression, the terms, A, B, and C are constants. As noted above, in many cases a simple quadratic will suffice for the instant purpose, for example, that quadratic may be as follows:

$$A*R + B*R^2 \qquad (2)$$

The correction expression or formula used in the program algorithm is simply the negative of the curve fitting equation used to define the envelope pattern of curves 32 and 34. Curvature is subtracted from the raw data input data or readings to provide the equivalent of the straight line 30 output.

Figure 6:
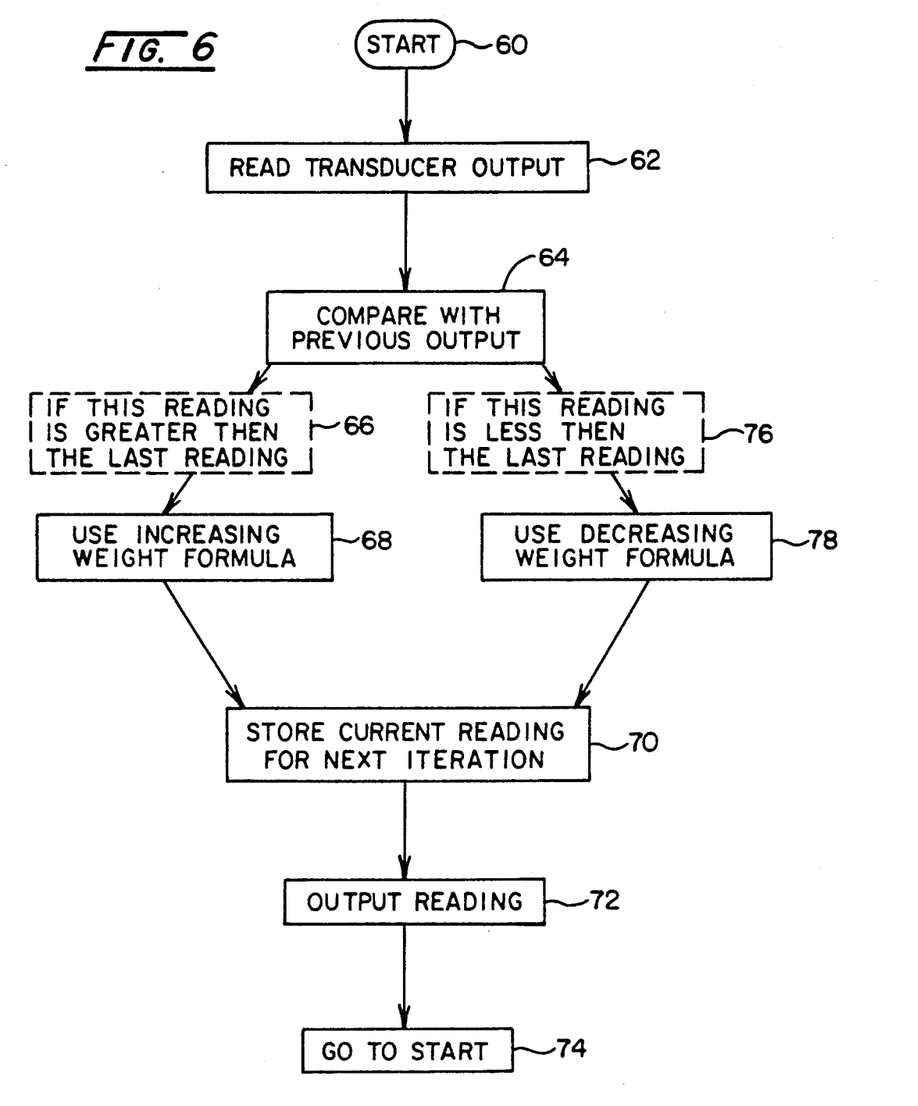
FIG. 6 is a flow chart showing a correction procedure for a non-complex load progression.

Referring to FIG. 6, a flow chart is portrayed depicting a program approach to providing correction in the case of FIG. 2 and employing the above hysteresis compensation expressions. Looking to the figure, at the commencement of the start of the program at node 60, the program calls for a reading of the transducer output at block 62. These are the data received from the instrumentation which, as noted above, preferably is filtered and may be previously compensated for other phenomena according to the compensation protocol desired. Upon reading the transducer output, then as represented at block 64, a comparison is made with the previous data or reading or the weighing device which will have been retained in temporary non-volatile memory. This input determines whether or not the reading represents a position on the increasing linearity curve 32 or the decreasing linearity curve 34. Such information is necessitated inasmuch as the sign and the value of the mathematical expressions themselves may vary depending on increasing or decreasing load conditions. As represented at dashed block 66, in the event that the instant reading is greater than the previous reading, then such historical data indicates that an increasing weight mathematical expression or formula is called for as is associated with increasing linearity curve 32. Thus, as represented at block 68, that formulation is employed. The program then stores the current reading, as represented at block 70 and this stored value represents the previous output for the next iteration of the program wherein it is compared with the next output reading as represented at block 64. Following this storage procedure, as represented at block 72, the weight reading as corrected for hysteresis is outputted to the next correction procedure or data treatment for display or the like.

The program then returns to the start node 60 as represented at block 74.

Where the convergence of the envelope curves 32 and 34 is encountered, for example at the maximum load level, then the comparison carried out at block 64 will, as represented at block 76, determine that the instant reading is less than the previous reading. This being the case, then, as represented at block 78, the correction expression associated with decreasing linearity curve 34 is employed. The program then continues as represented at blocks 70 et seq.

Figure 7:
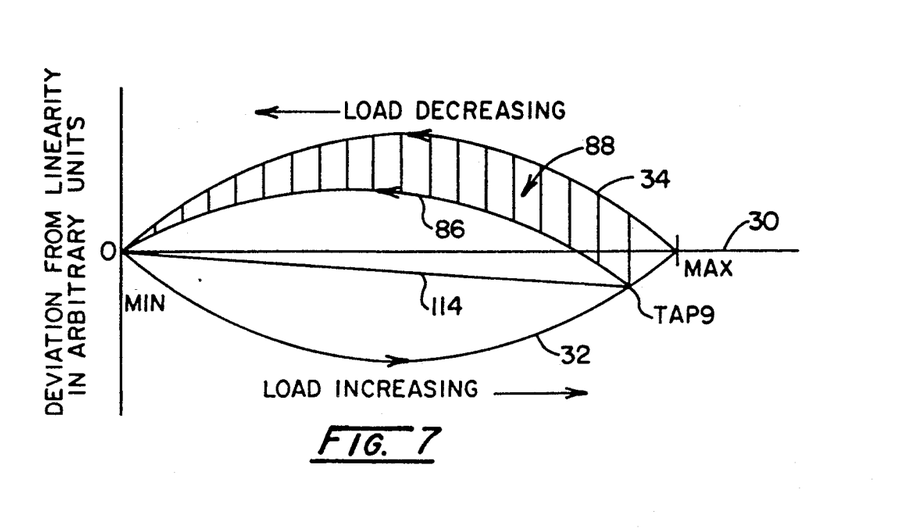
FIG. 7 is a graphical representation similar to FIG. 2 but showing a transition from a load increasing progression to a turn-around point and return to minimum load in a progression of loads.

Now considering a more complex form of hysteresis compensation as may be associated with weighing conditions or parameters discussed, for example, in connection with FIGS. 3–5, reference is made to FIG. 7. In FIG. 7, the envelope pattern characterized by curves 32 and 34 in conjunction with line 30 again is reproduced. Additionally shown in the drawing is a weighing condition wherein loads are added and removed from a weighing mechanism in the manner of FIG. 1. However, on a second excursion, a turn-around point TAP 9 is witnessed, the change in weight loading direction whether increasing or decreasing not occurring at the extremal points of the envelope pattern. With a turn-around point as at TAP 9, a decreasing load curve 86 then ensues in the manner described in connection with FIG. 3 which continues to the zero convergence or minimum position of the envelope pattern. It may be observed from FIG. 7 that a region highlighted by vertical lines and represented in general at 88 extends from a first such vertical line labeled "W0" at the turn-around point TAP 9 to a corresponding point on the decreasing linearity curve 34. Note that region 88, as it extends from line W0 to the zero convergence is comprised of vertical lines which become shorter as that convergence is approached. Thus, for decreasing loadings falling along the curve 86, an output can be predicted based upon the known curve of decreasing linearity 34 and curve 86. Accordingly, instead of employing a multiplication of a given expression by a form of ratioing factor as discussed above, an error value may be developed as a width difference from the known and consistent curves 32 and 34 defining the envelope pattern. A variety of techniques for developing such error data are available, for example, region 88 has the attributes of exponential decay from line W0 to the zero convergence point of the envelope pattern.

Figure 8:
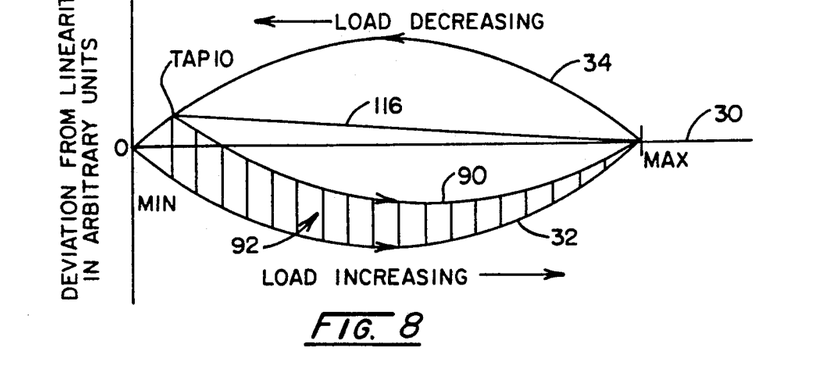
FIG. 8 is a graphical representation similar to FIG. 2 but showing an interruption in a decreasing load progression at a turn-around point and a subsequent increasing load progression to maximum load.

Turning to FIG. 8, an opposite condition as related to the discussion provided in connection with FIG. 4 is illustrated. In this figure, the curves 32 and 34 representing the extreme boundaries of the envelope pattern again are reproduced in conjunction with weight line 30. As before, the weighing apparatus is loaded from zero or minimum loading to maximum or full load and then is progressively unloaded to follow the decreasing linearity curve 34 toward zero. However, the weighing procedure then is reversed at turn-around point TAP 10 and weights then are added to evoke the increasing load curve 90 extending to the point of convergence at maximum loading for curves 32 and 34. The same analysis applies in the instant demonstration as described in conjunction with FIG. 7, however, a rotated image approach is now employed for this condition of starting at full load. Again, a vertical line W0 may be drawn from turn-around point TAP 10 and a region 92 may be observed as it extends between curves 32 and 90 and converges at the maximum load position. As before, a correction is achievable for a given position at curve 90 by combining a correction value derived from a vertical line or value within region 92 with the mathematical expression for the increasing linearity curve 32. For example, region 92 exhibits an exponential decay which may be mathematically represented. Considering this decay, one may conclude from the demonstration of FIGS. 7 and 8 that, starting from any position on the envelope pattern defining curves 32 and 34, and applying loads in an opposing direction to the weight progression represented thereby, (the arrow shown thereon) the tendency is for the actual output of the weighing apparatus to decay into or approach one of the envelope pattern external profiles or curves. It may be generalized, that no matter where a load progression transition is made at a turn-around point, a curve will be generated which tends to approach the limiting envelope pattern and the amplitude values thereof never exceed or represent an excursion beyond that envelope pattern. Thus, a mathematical expression may be derived which always tends to return a deviation towards the predicted limiting envelope pattern to evolve the components for hysteresis compensation. Where the load upon the apparatus is decreased, the resultant decreasing loading curve will tend to approach the decreasing linearity curve 34 and the opposite condition obtains, where the load is increasing, a characteristic curve will evolve which tends to approach the increasing linearity curve 32.

Considering now an exponential decay form of error determination, for each of the cases represented in FIGS. 7 and 8, the extent or width of the vertical lines within regions 88 or 92 may be considered to vary as follows:

$$\text{WIDTH} = W0 * \exp[(R - R0)/\text{TAU}] \quad (3)$$

Where W0 is the initial width as represented in FIGS. 7 and 8, R0 is the output of the apparatus at the turn-around point as represented at TAP 9 or TAP 10; R is the given reading in question and TAU is a constant representing the decay which may carry a sign and value representative of increasing or decreasing load sequences.

With the above in mind, the correcting formulas which may be employed may have the following appearance:

$$A*R + B*R^2 + C*R^3 + W0*\exp[(R-R0)/\text{TAU}] \quad (4)$$

In general, the error correction formulas will have the appearance set forth above. Each time the weight loading on the force measuring apparatus changes direction, a new value for W0 is calculated and the correction formula is applied. This mathematical insight also obtains with respect to the elaborate loading conditions or parameters represented in FIG. 5. Returning to that figure, it may be seen that the dashed lines constituting region 94 extant between curves 50 and 34 again represent this discernible correction region. That region 94 will tend to approach, in decaying or definitional fashion, the limiting envelope represented by decreasing linearity curve 34 and thus becomes a cognizable component of correction. In similar fashion, the region represented by dashed lines at 96 between curves 32 and 52 also is seen to approach increasing linearity curve 32 as a limit and exhibits a similar decay or otherwise definitional function.

Figure 9:
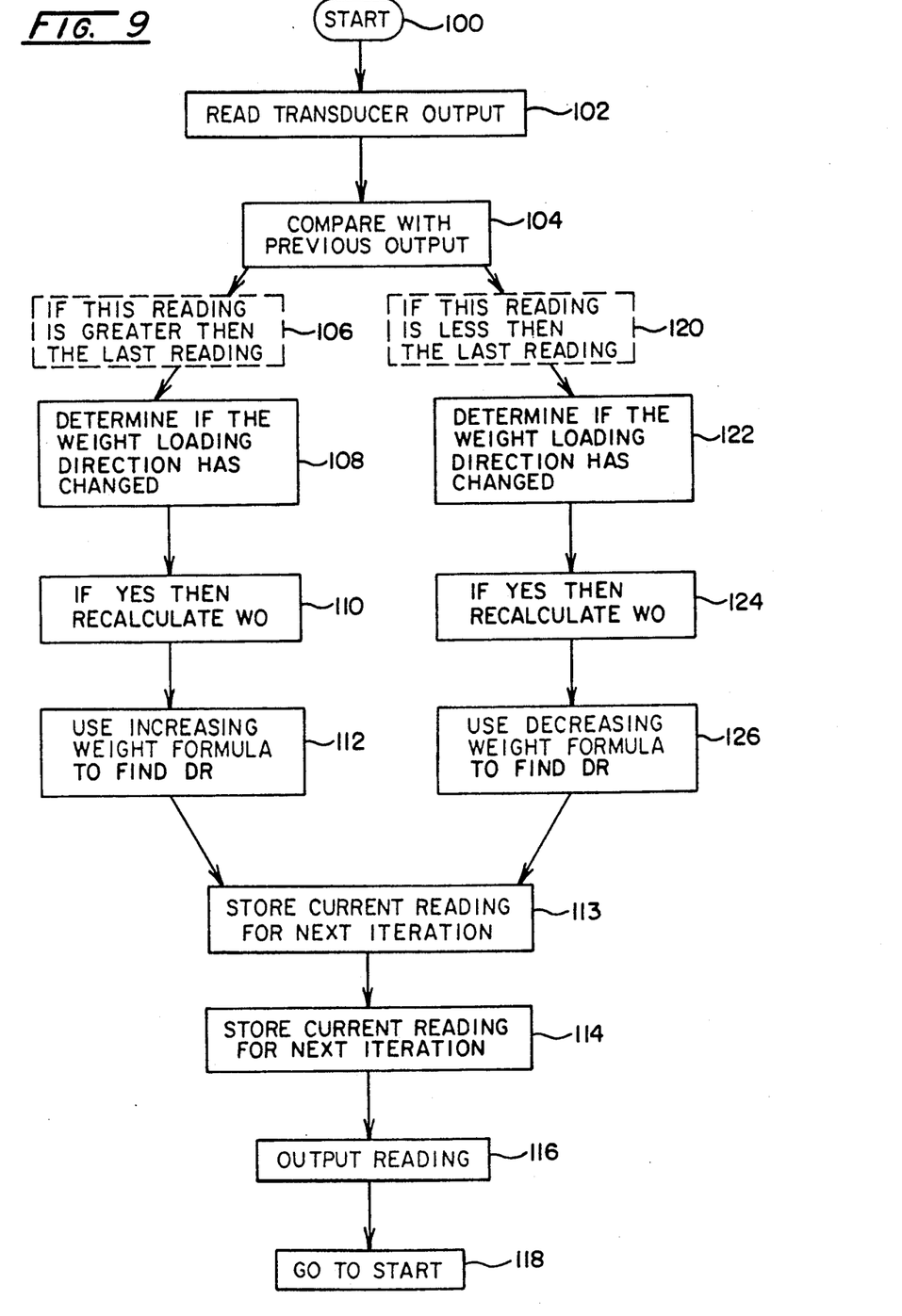
FIG. 9 is a flow chart describing a correction procedure according to the invention for a more complex sequence of scale loadings.

Referring to FIG. 9, a flow chart representation of a program which may implement the general correction case represented above is portrayed. In the chart, the program commences with a start indication represented at node 100 and progresses to the instructions at block 102. Here, the transducer output is read to achieve the data value, R which, as described later herein, may be filtered. Recall, additionally, that other correction procedures may have been applied to achieve this data value, R, for instance creep correction or the like, depending upon the protocol desired by the designer. The program then progresses as represented at block 104 to a determination of a comparison with the previous output. This determination is made inasmuch as it is necessary to be cognizant as to whether weights are being increased or decreased. In this regard, if the instant reading is greater than the last or previous reading, then as represented in dashed boundary 106, the program proceeds to the instructions at block 108. At block 108, a determination is made if the weight loading direction has changed. In effect, this determination is one evaluating as to whether a turn-around point (TAP) or transition has been encountered. Thus, two questions will have been addressed determining whether the weights are increasing and whether this is the first time that the weights are increasing. If the instant weighment represents a turn-around point (TAP) then, as represented at block 110, it is necessary to recalculate the value W0. On the other hand, where no turn-around point (TAP) has been encountered, then the value of W0 remains the same value as the previous pass or evaluation. Each time a turn-around point (TAP) is encountered, representing a change in increasing or decreasing direction of weight, a recalculation of W0 is made. The program then proceeds as represented at block 112, an increasing weight formula being employed to find the value, DR, where DR is a differential or delta value to be added with the received reading to derive a corrected output. Upon finding the value, DR, the program then derives the corrected output, CR, as represented at block 113. The program then stores the current reading for the next iteration of the program, as set forth in block 114, that current reading becoming the previous reading, PR, for such next iteration. The reading as corrected, as represented as, CR, is then outputted to the using or display agency as represented at block 116 and the program returns to start as represented at block 118.

In the event the determination made in conjunction with the instructions at block 104 shows that the current reading is less than the last reading, as set forth at dashed boundary 120, the program proceeds along the right component of the flow chart, wherein a determination is made as to whether the weight loading direction has changed as set forth at block 122. In the event of an affirmative determination, a turn-around point (TAP) is then detected and the value W0 is recalculated as set forth at block 124. A decreasing weight formula is then employed to find the value, DR, as set forth at block 126 and the program progresses, as before, to derive corrected output, CR, and to store and output the reading as represented at blocks 113, 114 and 116, and then returns to start as represented at block 118.

A program in Basic, a well known computer language, following the flow chart represented in FIG. 9 is given below. This program, while not being employed in the actual practice of the invention in view of later disclosed improvements, serves as an initial tutorial approach to the subject matter. The numbers provided in parenthesis to the right of the program information identify the blocks within FIG. 9 to which that part of the program pertains. In the program shown, AI, BI, CI, AD, BD, CD, BIE, and BDE are constants which will vary from one load cell to another and are developed as part of a calibration procedure in the course of their manufacture.

```
START:
(102)       INPUT R
(104, 106)  IF R = PR THEN S = 1
(104, 106)           ELSE S = −1
(104)       END IF
(106)       IF R = PR THEN
(108, 110)  IF PS  S THEN AIE = DR − AI * PR − BR *
            PR² − CI * PR³
            R0 = PR
(108)       END IF
(112)       DR = AI * R + BI * R² + CI * R³ + AIE *
            exp (−BIE * (R − R0))
(120        ELSE
(122, 124)  IF PS  S THEN ADE = DR − AD * PR − BD *
            PR² − CD * PR³
            R0 = PR
            END IF
(126)       DR = AD * R + BD * R² + CD *R³ + ADE *
            exp(−BDE * (R − R0))
(122)       END IF
(113)       CR = R + DR
(114)       PR = R
            PS = S
(116)       PRINT CR
(118)       GOTO START
```

At block 102 and the corresponding program line, the raw datum, R, is read. An identifier, S, then is employed as an indicator of the direction in which the weight is progressing whether increasing or decreasing as represented at blocks 104, 106, and 120 and the corresponding program lines. In particular looking to the program line corresponding to block 106,, where the identifier is set equal to +1, then an increasing condition is at hand and, as represented adjacent to the program lines corresponding with blocks 104 and 120, where the value R is less than the previous reading then a decreasing condition is at hand and the identifier, S, is set equal to −1. As represented adjacent to the program line represented by block 106, where a determination is made that the weight progression is an increasing one, then, the program is aware that the weight is advancing and the query as represented by the program line adjacent to 108 and 110 is made as to whether this is the first such increase. In effect, a determination is made as to whether the previous value of S, referred to as PS, is not equal to S. Where that is the case, then the value AIE or attenuation for the increasing error, corresponding to W0 is computed. Additionally, the term, R0, is made equal to the term PR, the latter representing the previous reading of raw data. If the value, PS, is not equal to S, aturn-around point is identified.

In the event that the previous S, i.e. PS is equal to the current S identified, then the W0 term does not need to be recalculated, inasmuch as there is no turn-around point. Given the existence of a turn-around point, R0, then as represented adjacent to block 112, the DR value may be computed.

Where the raw data reading does not meet or exceed the previous such reading then, as represented at the ELSE statement adjacent to block 120, then a decreasing load condition is at hand and, as represented adjacent to blocks 122 and 124, the valuation of the value S with the previous value of S, or PS, is made. Where equality is not present between these values, then a turn-around point is at hand and the value W0 here identified as ADE for attenuation for decreasing error is determined and the turn-around point, R0, will be the previous reading, PR. On the other hand, if no turn-around point was determined, then in accordance with the END IF statement, no such redetermination of W0 is made. As represented then adjacent to block 126, the delta or difference value, DR, representing change in R, is computed. As represented adjacent to block 113, the corrected output, CR, then is derived as the sum of R and DR. The block identifier 114 shows that the previous reading is now made equal to R and the previous value of S is now made equal to S for the next iteration. As represented adjacent to block 116, the corrected reading, CR, is printed and as shown adjacent to block 118, the program returns to start.

It may be observed from the above program that there resides a desirable symmetry in the correction system between both load increasing or load decreasing situations. Identical techniques for deriving turn-around points (TAP) are provided and a similarity is immediately recognized between the derivation of AIE and ADE. Further, the two mathematical paths for DR exhibit this same desirable symmetry. This approach is highly desirable in programming, for example, for microprocessor driven instrumentation. In effect, the program commences with an "IF" statement and ends with an "END IF" statement.

A different correctional analysis is realized with an approach based upon the following expression:

$$DR = A^*R + B^*R^2 + C^*R^3 + PW0^*(1-(R-PR)/TAU), \quad (5)$$

In the above expression, PR is the R value from the previous update and PW0 is the length of the vertical line described earlier as W0 in the next previous update. Thus, the second component of the above expression is an indication of how much smaller that vertical line became as a result of change in the output readings. The expression is essentially in differential format. Contrasting with the previous expressions, it may be observed that the term "R0" is not present.

An improved formulation for calculation of the shaded regions as at 88 and 92 avoids the utilization of exponential decay and, instead, looks to the use of a straight line approximation. With the approach, the distance from the envelope defining curves 32 or 34 at the turn-around point is calculated. Then, it is assumed that the curve which the output follows is a straight line from the starting point extending to the origin. For example, in FIG. 7, a line 114 is seen extending from turn-around point TAP 9 to the origin or minimum valuation. For increasing weights, the formula may take the following form, RMAX representing the maximum possible reading:

$$DR = A^*R + B^*R^2 + C^*R^3 + W0 \cdot \frac{(RMAX - R)}{(RMAX - R0)}, \quad (6)$$

For decreasing loadings a rotated approach may be used, as represented by line 116 in FIG. 8 extending from turn-around point TAP 10 to maximum loading within envelope defining curves 32 and 34. Assuming a term RMIN, which otherwise might be used, to be zero, this decreasing weight formulation takes the following form:

$$DR = A*R + B*R^2 + C*R^3 + W0 * \frac{R}{R0}. \quad (7)$$

Higher levels of accuracy can be developed by, in effect, bowing the lines 114 and 116. For increasing weights, this can be achieved with the insertion of the term seen below commencing with the constant, DI. Thus, the expression for increasing loadings or weights may take the following form:

$$DR = A*R + B*R^2 + C*R^3 + W0 * \quad (8)$$

$$\left[ \frac{(RMAX - R)}{(RMAX - R0)} - DI * \frac{(RMAX - R)*(R - R0)}{(RMAX - R0)} \right]$$

Correspondingly, the formula for decreasing loadings or weights, employing the constant term, DD, becomes as follows $$DR = A*R + B*R^2 + C*R^3 + W0 * \quad (9)$$

$$\left[ \frac{R}{R0} - DD * \frac{R*(R0 - R)}{R0} \right].$$

The constants DI and DE serve to adjust the amount of curvature of the return curves.

As indicated earlier herein, the compensation expressions employed to reduce the effects of hysteresis in the output of the weighing apparatus look to the history of the load cell to determine whether any current reading is higher or lower than the previous reading. Depending upon the result of this historical determination, a correction factor then is computed. During the actual procedure of weighing in the field, the output of any transducer type device often is not smooth, in that it is subjected to bounce, static noise, temperature effects, and the like. This may cause the control system to be exercised in updating procedures to an extent that it will lose resolution. It is desirable, therefore, to filter the received data, for example, awaiting a reasonably significant weight change before carrying out an update. A simpler and more desirable aproach is one which essentially "smooths" the weight data and thus reduces the number of turn-around points. Such an approach may be developed in accordance with the following expression:

$$FR = 0.1*R + 0.9*PFR \quad (10)$$

Where FR is the filtered reading used in carrying out the above data manipulation, R is the actual data point and PFR is the FR used in the previous iteration. Thus, each time an output is received, one-tenth of the current reading is added to nine-tenths of the last filtered reading. This means that any one reading can only affect the output of the system by 10%. If the readings are steady then, approximately, R=FR. If the readings are changing, the effect is strong enough to reduce noise and overshoot to a smoothly changing curve. Of course, for more noisy or vibration prone environments, a stronger filtering can be employed for the purpose of reducing the number of turn-around points due to load induced oscillation and noise. Noise may be occasioned both electronically and by loading.

Figure 10:
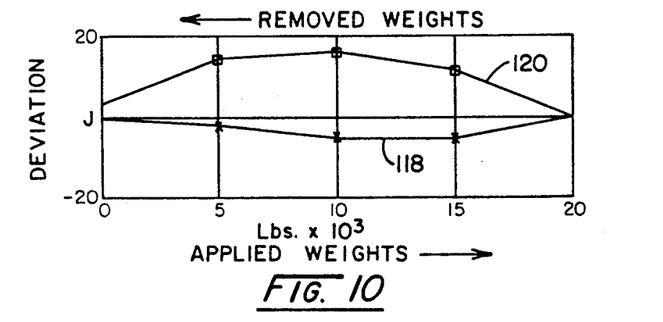
FIG. 10 is a graphical representation of a simple loading procedure carried out in conjunction with a laboratory based observation.
Figure 11:
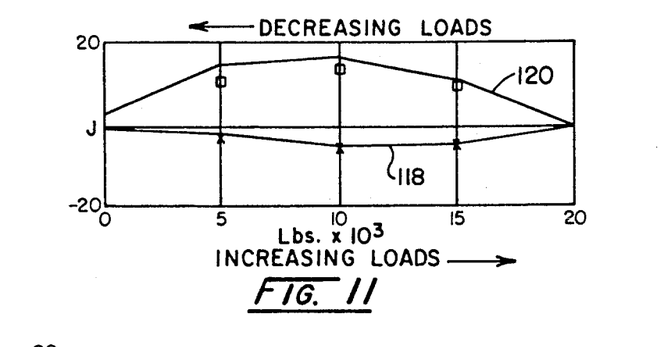
FIG. 11 is a graph showing the data of FIG. 10 but in conjunction with a polynomial based plot corresponding therewith.
Figure 12:
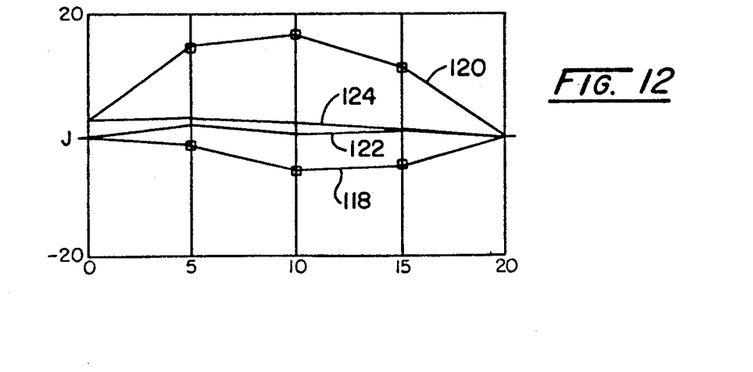
FIG. 12 is a graphical representation of a correction procedure carried out with respect to the data generated in conjunction with FIG. 10.

The envelope represented by curves 32 and 34 has been generated within a laboratory environment. For example, a sequence of weights has been applied to a compression beam cell, the sequence in 5,000 pound increments ranging between zero pounds and 20,000 pounds, and returning then to zero pounds. The cell output resulting from the exercise is represented in FIG. 10 as increasing linearity curve 118 and decreasing linearity curve 120, the curves not being adjusted for symmetry. Employing the form of Expression (1) above, two curves were then generated to evolve a matching envelope pattern. The results of the curve generations are shown in FIG. 11 where rectangles indicate calculated points for decreasing loads, as represented at curve 120 and x's show calculated points with respect to curve 118. Curves 120 and 118 again are reproduced in FIG. 12 along with respective compensation curves 122 and 124. The latter curves represent that the hysteresis compensation approach of the invention for the simple case of load application from zero to maximum and return works well.

Figure 13:
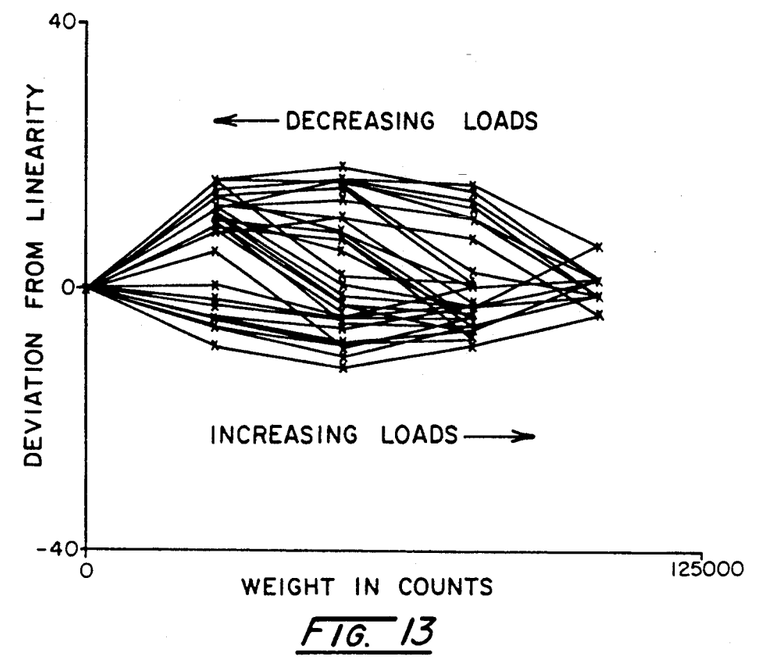
FIG. 13 graphically illustrates hysteresis effects for readouts representing a complex progression of loads applied to a scale.
Figure 14:
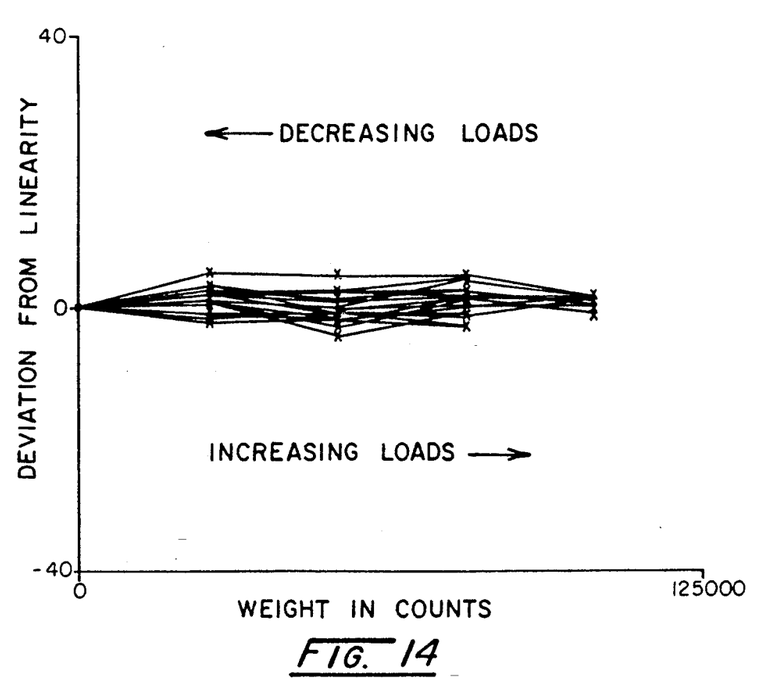
FIG. 14 graphically depicts deviation from linearity for a correction of the hysteresis based deviations represented in FIG. 13.

An evaluation of the hysteresis compensation approach of the invention was carried out, again employing a compression beam load cell which was gauged and combined with appropriate instrumentation including analog-to-digital based signal treatment. The output of this cell was then loaded into a computer for treatment and analysis. The resulting analysis consisted of two readings, a corrected output, and the amount of correction required to develop that output. Thus, by appropriate combination, the uncompensated data becomes available for observation. The sequence of weight applications employed in this evaluation included several full runs as the weights progress from the least to maximum and return. Subsequently, several runs, commencing at the least loading and progressing only a portion of the way to maximum load before returning to the least loading were carried out. Following this exercise, full weight was applied and then weights or loads partially removed and reapplied again several times. Further random weight changes were then initiated in an attempt to simulate any and all weight changes that might be encountered in the field. FIG. 13 shows the raw data in an error or deviation graphical form. By applying the compensation procedures of the invention, the corresponding graphical representation of deviation shown at FIG. 14 was developed. In the latter compensation approach, the expressions as represented at (8) and (9) were employed.

Figure 15:
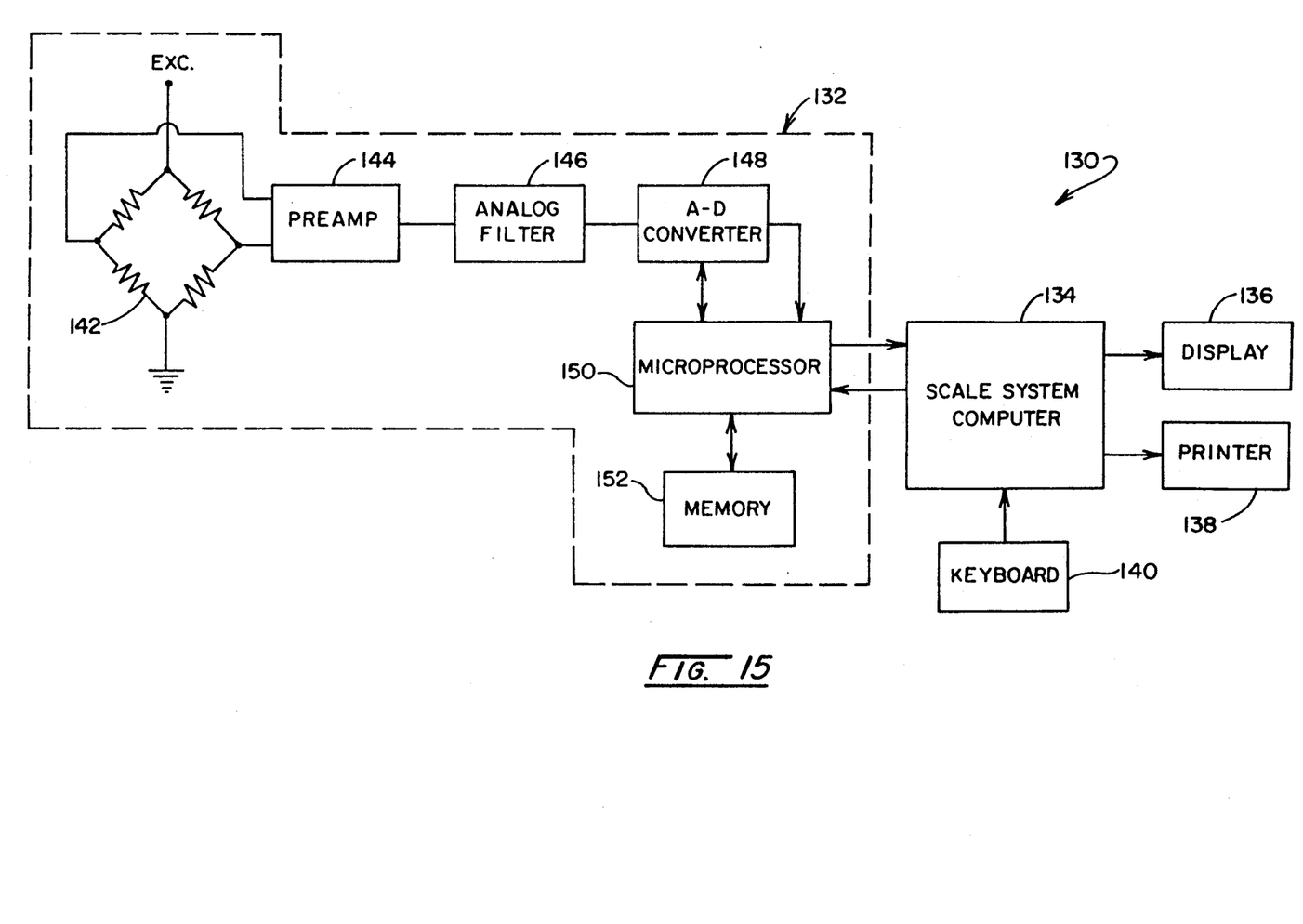
FIG. 15 is a block diagram representing, in enhanced detail, a preferred form of weighing apparatus incorporating the present invention.

Referring to FIG. 15, a form of weighing apparatus incorporating the present invention is portrayed generally at 130. Apparatus 130 includes a "digital load cell" generally designated at 132 which is interfaced with a host or scale system microcomputer 134. Along with other functions, microcomputer 134 controls a display 136 and a printer 138, and receives operator information through a keyboard or keypad 140. The apparatus of FIG. 15 differs from a more typical arrangement as represented in FIG. 1 primarily in that various electronic circuits have been combined on the same printed circuit board with an A/D conversion function and a dedicated load cell microprocessor and memory has been added. The result is a digital load cell which may be calibrated, compensated and corrected as a unit in itself, and incorporated into a variety of microcomputer controlled scale systems. When so incorporated, the digital load cell is interfaced with the scale or host microcomputer, such as that at 134.

In the form shown in FIG. 15, digital load cell 132 includes a strain gauge bridge 142 which provides an analog weight signal to a preamplification function 144 which, in turn, provides an amplified output which is submitted to an analog filtering function 146. The filtered and thus preamplified output then is converted to digital format by an analog-to-digital converter represented at 148 which is under the control of a programmed microprocessor represented at block 150. Digitized weight data are transferred to the microprocessor which, performing in conjunction with memory as represented at 152, components of which are non-volatile to preserve historic data, hysteresis and other forms of correction which may be carried out in digital fashion. Microprocessor 150 also communicates with the scale system microcomputer 134 and transmits thereto weight data which may be further processed and displayed, for example, at display 136.

Since certain changes may be made in the above-described, method, and apparatus without departing from the scope of the invention herein involved, it is intended that all matter contained in the description thereof or shown in the accompanying drawings shall be interpreted as illustrative and not in a limiting sense.

I claim:

1. The method for correcting the output of an electronic weighing scale for hysteresis effects occurring between minimum and maximum loads applied thereto with a given load progression history comprising the steps of:
   storing a derived polynomial expression representing the increasing linearity characteristic values of said scale extending from said minimum to said maximum loads;
   storing a derived polynomial expression representing the decreasing linearity characteristic values of said scale extending from said maximum to said minimum loads;
   storing an increasing weight correction expression incorporating said increasing linearity polynomial expression and representing an offset therefrom;
   storing a decreasing weight correction expression incorporating said decreasing linearity polynomial expression and representing an offset therefrom;
   obtaining a representation of value, R, of a load applied to said scale;
   comparing said representation of value, R, with the previous such representation, PR;
   determining said offset for said previous representation, PR, as a value WO, when said value, R, represents a reversal of said load progression;
   deriving a correction value as an application of said values, R and WO, to one of said correction expressions;
   adjusting said value, R, by the amount of said correction value; and
   outputting said adjusted value.

2. The method of claim 1 in which said correction expressions are derived to provide an offset from one of said polynomial expressions having a value always falling within an envelope of values defined by said derived polynomial expressions.

3. The method of claim 1 in which each said correction expression includes an exponential decay function having a said polynomial expression as a limit.

4. The method of claim 1 in which said polynomial expressions have the form:

$AR + BR^2 + CR^3$, where A, B, and C are constants.

5. The method of claim 1 in which said correction value is derived using said increasing weight expression when said value, R, is greater of said value, PR.

6. The method of claim 1 in which said correction value is derived using said decreasing weight expression when said value, R, is less than said value, PR.

7. The method of claim 1 in which said increasing weight expression has the form:

$A^*R + B^*R^2 + C^*R^3 + WO^*$
$(RMAX - R)/(RMAX - RO)$, where RMAX is the value of said maximum load, A, B and C are constants and RO is a said representation of load value corresponding with WO.

8. The method of claim 1 in which said increasing weight expression has the form:

$A^*R + B^*R^2 + C^*R^3 + WO^*$
$[(RMAX - R)/(RMAX - RO) - DI^*$
$(RMAX - R)^*(R - RO)/(RMAX - RO)]$, where RMAX is the value of said maximum load, A, B, C and DI are constants and RO is a said representation of load value corresponding with WO.

9. The method of claim 1 in which said decreasing weight expression has the form:

$A^*R + B^*R^2 + C^*R^3 + WO^*R/RO$, where A, B and C are constants and RO is a said representative load value corresponding with WO.

10. The method of claim 1 in which said decreasing weight expression has the form:

$A^*R + B^*R^2 + C^*R^3 + WO^*$
$[R/RO - DD^*R^*(RO - R)/RO]$ where A, B, C and DD are constants and RO is a said representative load value corresponding with WO.

11. The method of claim 1 in which said increasing weight expression has the form:

$AI^*R + BI^*R^2 + CI^*R^3 + WO^* \exp$
$(-BIE^*(R - RO))$ where AI, BI, CI and BIE are constants and RO is a said representation of load value corresponding with WO.

12. The method of claim 1 in which said decreasing weight expression has the form:

$AD^*R + BD^*R^2 + CD^*R^3 + WO^* \exp$
$(-BDE^*(R - RO))$ where AD, BD, CD and BDE are constants and RO is a said representation of load value corresponding with WO.

13. The method of claim 1 in which said step of obtaining a representation of a load includes the step of filtering the received said representation of a load by deriving a value limited to a predetermined allowable incremental change with respect to a next previous representation of a load to derive said representation of value, R, employed to derive said correction value.

14. The method of claim 13 in which said filtering is carried out by calculation using an expression of the following form:

$FR = E^*R + F^*PFR$ where E and F are constants satisfying the relation: $E+F=1.0$, FR is the filtered representation value of a load and PFR is the value of the previous filtered representation value of a load.

15. Weighing apparatus compensated for hysteresis effects occurring between minimum and maximum loads applied thereto with a given load progression history, comprising:

a weighing mechanism;

means for storing predetermined expressions representing the increasing and decreasing deviation linearity characteristics of said weighing mechanism extending between said minimum and maximum loads;

means for storing increasing and decreasing weight correction expressions incorporating said increasing and decreasing linearity characteristics, respectively, and representing offsets therefrom;

means for obtaining a representation of value, R, of a load applied to said weighing mechanism;

means for comparing said representation of value, R, with a previous such representation, PR;

means for determining said offset for said previous representation, PR, as a value, W0, when said value, R, represents a reversal of said load progression;

means for deriving a correction value applying said values, R and W0, to one of said weight correction expressions;

means for adjusting said value, R, by the amount of said correction value; and means for outputting said adjusted value.

16. The weighing apparatus of claim 15 wherein said correction value is derived using said increasing weight expression when said value, R, is greater than said value, PR.

17. The weighing apparatus of claim 15 wherein said correction value is derived using said decreasing weight expression when said value, R, is less than said value, PR.

18. The weighing apparatus of claim 15 in which said predetermined expressions have the form:

$AR+BR^2+CR^3$, where A, B and C are constants.

19. The weighing apparatus of claim 15 including means for storing a change in said load progression history by replacing said previous representation, PR, with said current representation, R.

* * * * *